Figure 1:
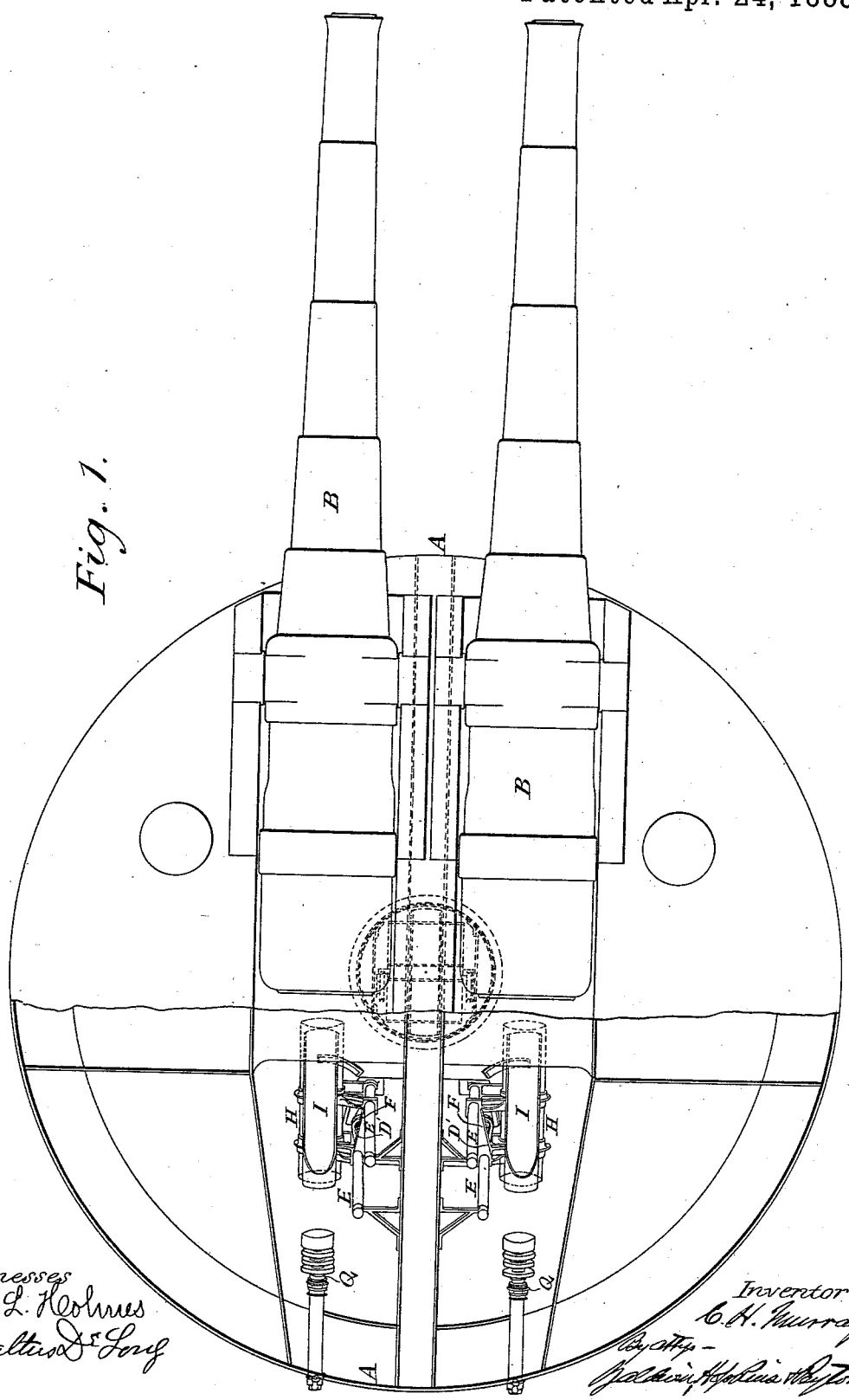

(No Model.) 7 Sheets—Sheet 3.

C. H. MURRAY.
APPARATUS FOR CONVEYING AMMUNITION TO GUNS.

No. 381,715. Patented Apr. 24, 1888.

(No Model.) 7 Sheets—Sheet 4.
C. H. MURRAY.
APPARATUS FOR CONVEYING AMMUNITION TO GUNS.
No. 381,715. Patented Apr. 24, 1888.
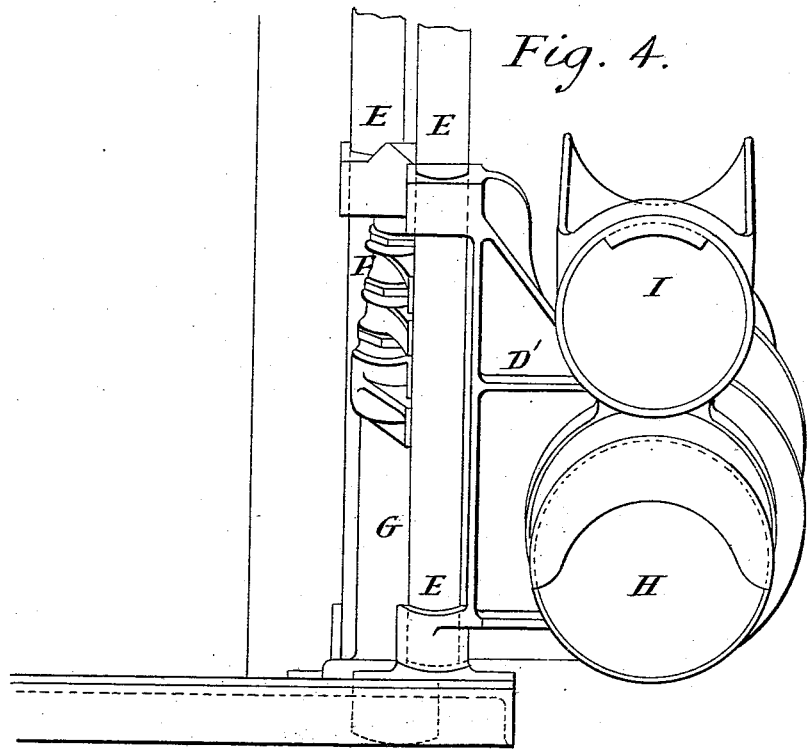
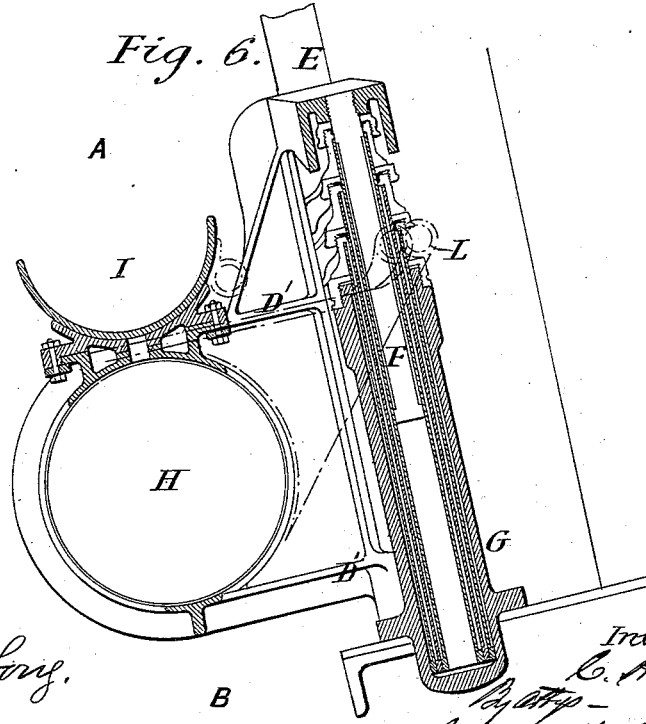

(No Model.)
7 Sheets—Sheet 5.

C. H. MURRAY.
APPARATUS FOR CONVEYING AMMUNITION TO GUNS.

No. 381,715.
Patented Apr. 24, 1888.

Witnesses

Inventor (No Model.) 7 Sheets—Sheet 7.

C. H. MURRAY.
APPARATUS FOR CONVEYING AMMUNITION TO GUNS.

No. 381,715. Patented Apr. 24, 1888.

Witnesses. Inventor.

UNITED STATES PATENT OFFICE.

CHARLES H. MURRAY, OF NEWCASTLE-UPON-TYNE, ENGLAND, ASSIGNOR TO W. G. ARMSTRONG, MITCHELL & CO., (LIMITED,) OF SAME PLACE.

APPARATUS FOR CONVEYING AMMUNITION TO GUNS.

SPECIFICATION forming part of Letters Patent No. 381,715, dated April 24, 1888.

Application filed June 7, 1887. Serial No. 240,556. (No model.)

*To all whom it may concern:*

Be it known that I, CHARLES HENRY MURRAY, a subject of the Queen of Great Britain, residing at the Elswick Works, Newcastle-upon-Tyne, England, engineer, have invented certain new and useful Improvements in Apparatus for Conveying Ammunition to Heavy Guns and for Loading the Same, of which the following is a specification.

The apparatus is designed to reduce the number of operations necessary to load and work heavy guns when mounted *en barbette* or in a turret. To effect this the turret or turn-table upon which the gun or guns are mounted is made to carry a hoist in rear of each gun, and such hoist is made to descend below the turn-table or turret-floor to there have ammunition supplied to it from another central hoist, and then to raise such ammunition into a line with the bore of the gun to allow of its being rammed directly into it. Usually two guns are mounted on each turn-table, and the turn-table carries two hoists—one in rear of each gun. The head of the central hoist is fitted with a small turn-table to enable the charges brought up by it to be turned to face either of the upper hoists which descend from the turn-table along guideways fixed thereto. The shot-trays of these latter hoists are also made to pivot, so that they may be brought into a position radial with the central hoist and allow of a projectile being slid from the central hoist onto either of the upper hoists. The upper hoists may be inclined so that their trays or platforms may, when lowered, come close to the tray or platform of the central hoist, so that a projectile may be slid from one to the other. The sliding of a projectile from the central hoist to either upper hoist is also facilitated by making the shot-trays of both to incline downward, and by making provision for raising the tray of the central hoist to a level above the tray of the upper hoist until the bottoms of the two trays form one inclined plane, down which the projectile may be slid. The inclination of the tray or platform of the upper hoist also brings the ammunition, when it has been raised by the hoist, into a line with the bore of the gun. By making the upper hoists to descend below the floor of the turret or turn-table to where there is room for men to walk about and where they can get at and handle the ammunition, the men can readily slide the projectile from the central hoist to one or other of the upper hoists, and also lift the powder-cases from one hoist to the other.

The drawings hereunto annexed show various views of my apparatus arranged as above described.

Figure 2:
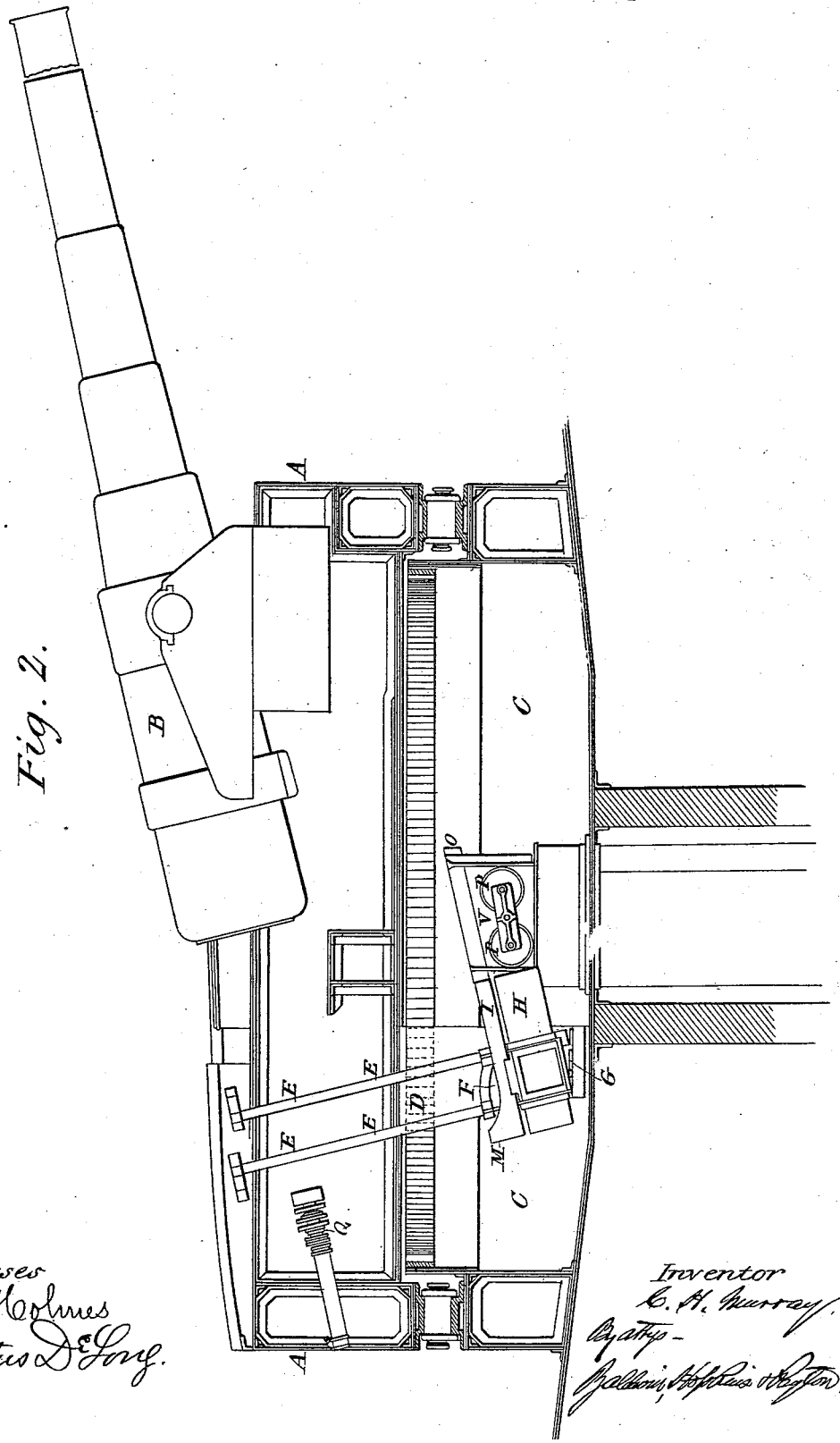
Figure 3:
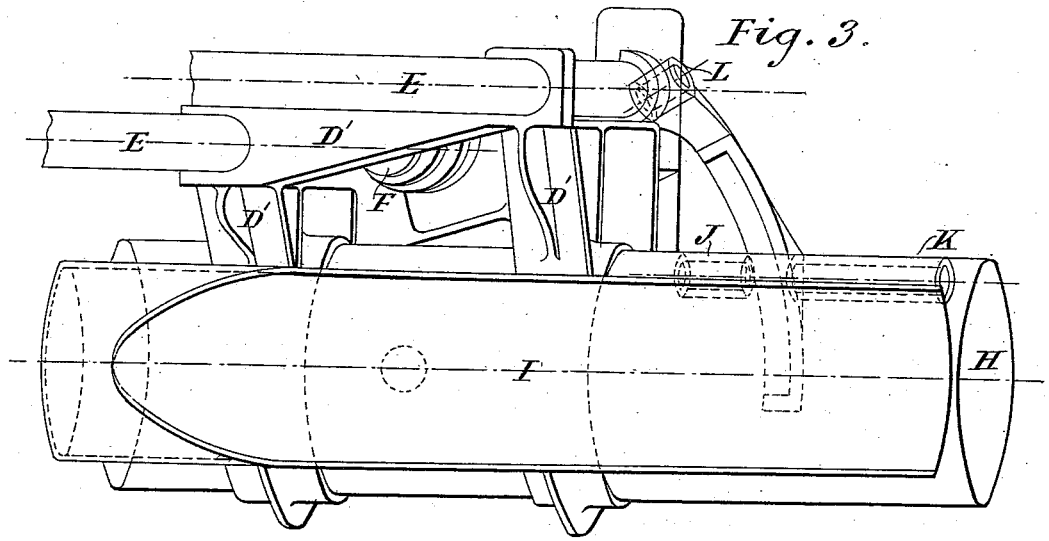
Figure 5:
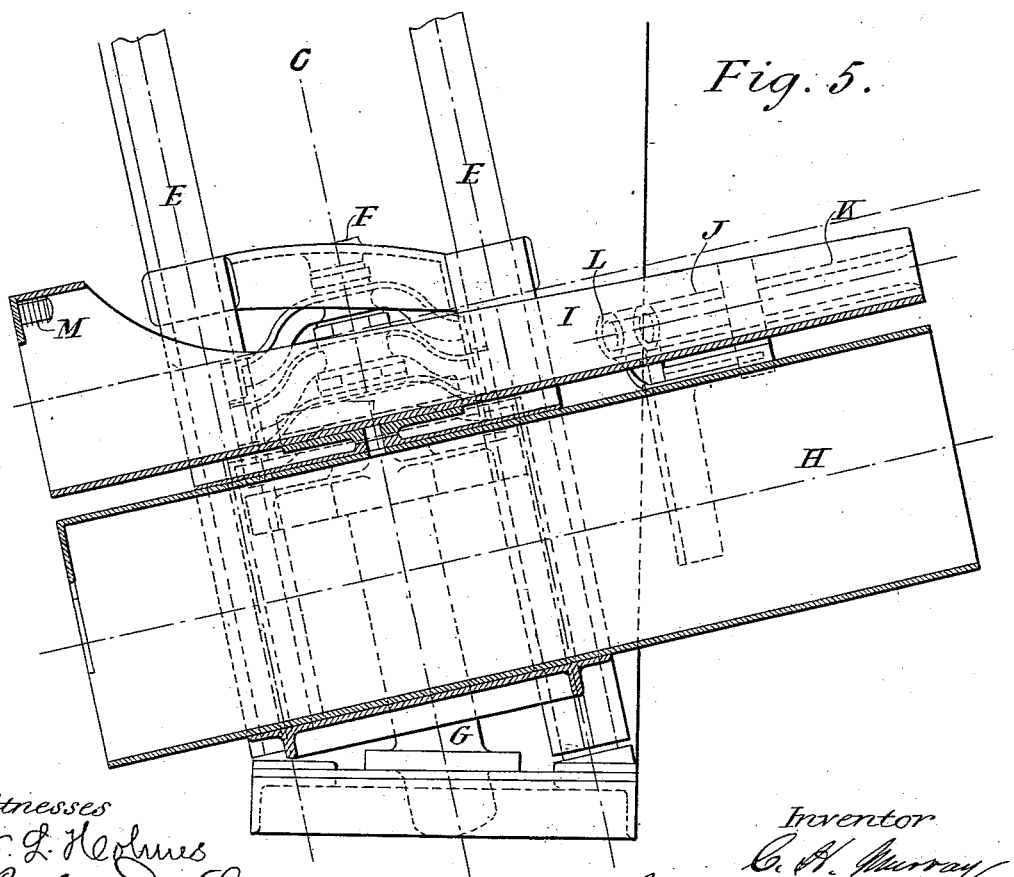
Figure 7:
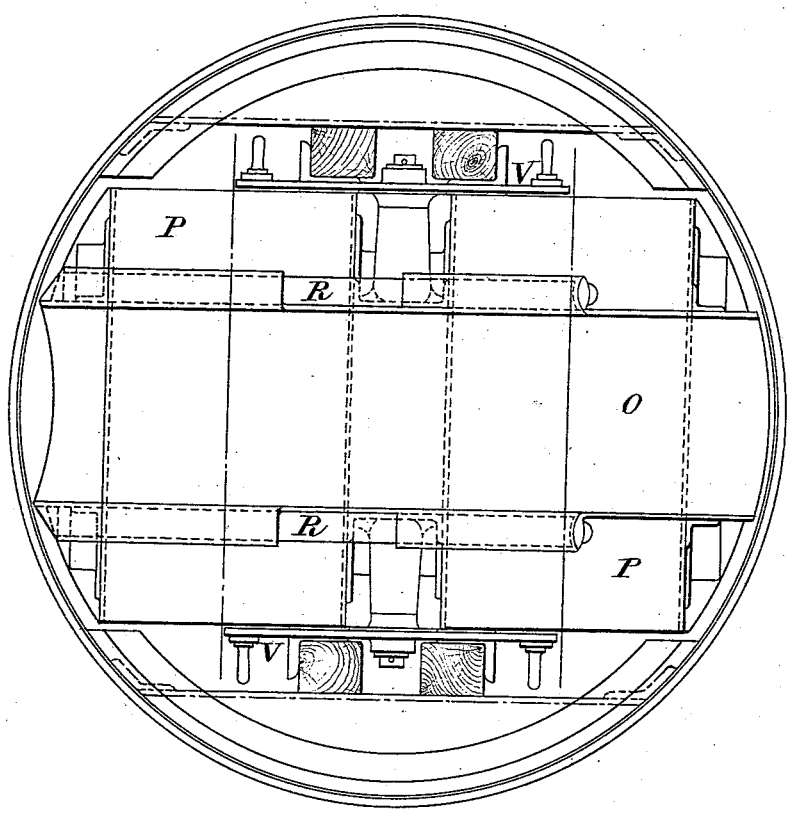
Figure 8:
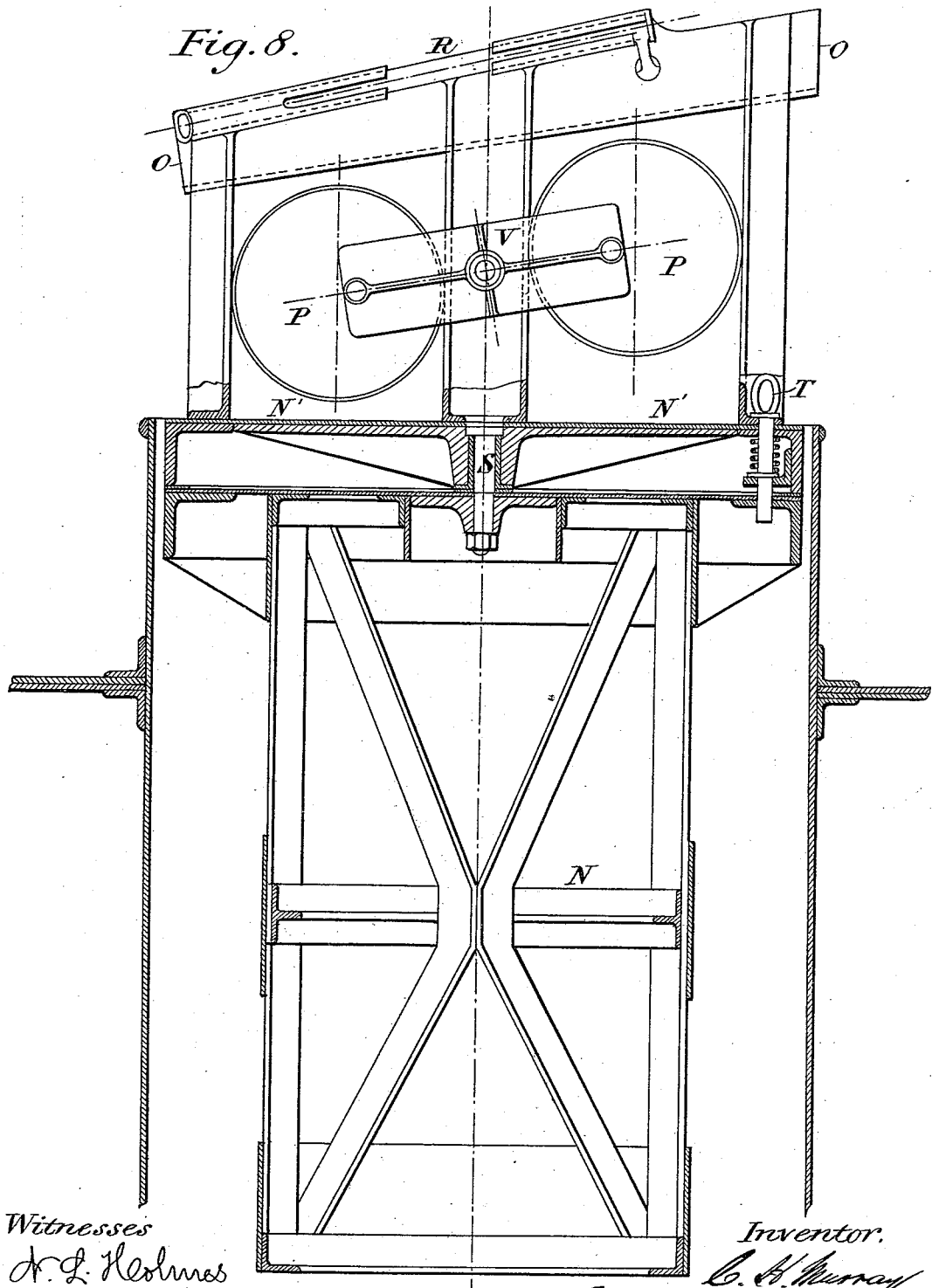
Figure 9:
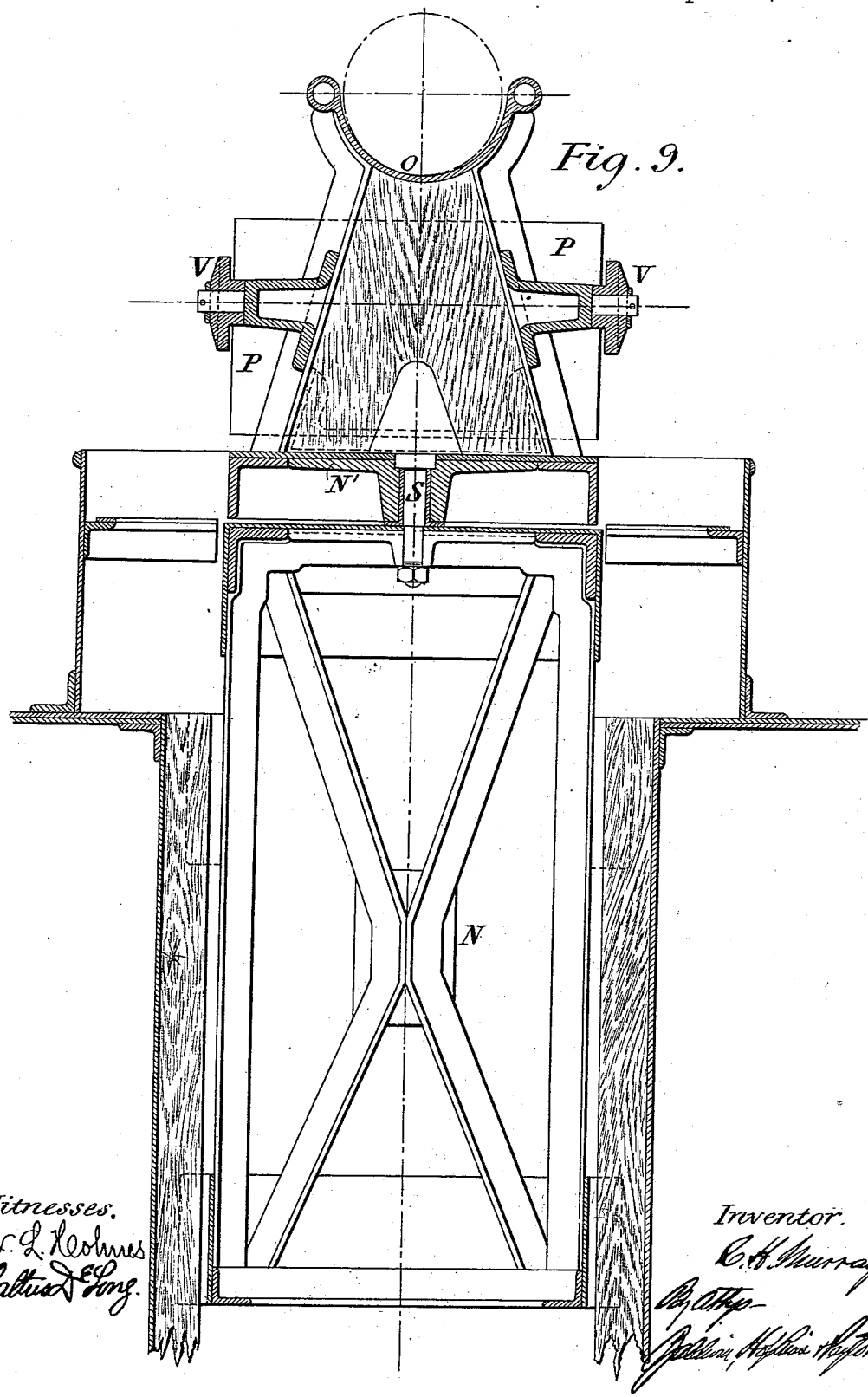

Figure 1 is a plan view, partly in section, and Fig. 2 a vertical section, of the apparatus. Fig. 3 is a plan view, Fig. 4 an end view, Fig. 5 a vertical section through the line A B, Fig. 6, and Fig. 6 a cross-section through the line C D, Fig. 5, of one of the upper hoists. Fig. 7 is a plan view, Fig. 8 a side elevation, partly in section, and Fig. 9 a vertical section at right angles to the section Fig. 8, of the platform or cradle and upper part of the central hoist.

A is a turret or turn-table with two guns, B B, carried by it on parallel slides, as is usual. In rear of the breech end of each gun is a traversing-slide, (not shown in the drawings,) by means of which the breech is opened and closed. In rear of each slide is an inclined hoist, D, which descends below the turret, and in a fixed path relatively thereto, into a chamber, C, high enough for men to walk about freely. Preferably I form each of these hoists in the manner shown at Figs. 3, 4, 5, and 6. It is composed of a frame, D', which slides up and down on fixed guide-rods E, and is raised and lowered on these rods by the telescopic ram F of a hydraulic cylinder, G. The rods E, constituting guideways for the hoists D, are fixed to the turret or turn-table. The frame D' has fixed to it a cylinder, H, for receiving the charge of powder. The cylinder is inclined at the loading-angle—that is, inclined to the same angle as the gun when the gun is brought to loading position. Pivoted to the top of this cylinder is a trough, I, for receiving the projectile. When the trough has been turned into a position radial to the central hoist, two tubular sockets, J K, on the trough are brought into a line with another tubular socket, L, fixed to the frame D'. A bolt, R, carried by the shot-tray O of the central hoist (see Fig. 8) can then be thrust through all the sockets, thereby locking the trough I in its position radially to the central hoist, and at the same time insures that if the turret is turned the cradle of the central hoist will be carried round with it. When the parts are so locked, a projectile may readily be slid down from the platform of the central hoist onto the shot trough or tray of the upper hoist.

M is a small buffer to stop the shot as it slides down from the central hoist.

The three largest of the telescopic tubes forming the ram F are powerful enough to lift the hoist when loaded with the powder and shot, and therefore when water under pressure is admitted to the hydraulic cylinder G the hoist rises for three-quarters of its stroke and then comes to rest with the shot at the right height for entering the gun. After the shot has been pushed off the hoist by the rammer the remaining tube has ample power, when water under pressure is again admitted to the cylinder, to raise the hoist to the top of the stroke to bring the powder-tube in line with the gun.

N' is the platform or cradle of the central hoist, N. It can be raised or lowered by ropes or chains worked by hydraulic power in any ordinary way. It is formed with a trough or tray, O, at the top for receiving a projectile, and below this boxes P P for the powder-cases.

S is a central pivot on which the platform or cradle of the hoist pivots, and T a drop-bolt to fix the turn-table top into correct position for going below, so that it shall not be foul of the guide-bars of the hoist-trunk.

V is a hinged stop to hold the powder in place within the boxes P.

When the cage of one of the upper hoists has been lowered and its shot-trough turned toward the pivoting-platform of the central hoist and locked to it, the projectile is by hand slid from the central hoist to the shot-trough of the upper hoist, and the powder is also removed by hand from the central hoist and slid into the powder-tube H of the upper hoist, this tube being partially closed at the bottom to prevent the powder-cases from dropping out. The charge of ammunition so loaded on to the upper hoist is then raised by it, and the projectile first brought into a line with the bore of the gun and rammed into it by a rammer, Q. Afterward the powder-tube is brought into a line with the bore and the powder-charge rammed in. The hoist is then lowered and the breech closed.

It is not essential that the hoists carried by the turn-table should be inclined so as to bring their lower ends in close proximity to the central hoist, although I prefer that they should be so inclined. The hoists carried by the turn-table might be set vertically, and a slide or slides provided for supporting the projectile as it is slid onto them from the central hoist.

I do not herein claim the combination of a turret or turn-table, a gun or guns mounted thereon, and an ammunition-hoist attached centrally to and beneath the turret or turn-table, and extending down to a magazine-chamber. This is claimed in my prior application, No. 239,858, for United States Letters Patent, filed May 31, 1887.

Having now particularly described and ascertained the nature of my said invention and in what manner the same is to be performed, I declare that what I claim is—

1. The combination of the turn-table or turret, a gun or guns mounted thereon, a hoist carried by the turret or turn-table in rear of each gun and descending into a chamber or space below the turn-table, and a central hoist by which ammunition can be raised up into the chamber or space to be transferred to the hoists descending from and carried by the turn-table, substantially as and for the purpose set forth.

2. The combination of the turn-table or turret A, a gun or guns, B, mounted thereon, a hoist in rear of each gun descending into a chamber or space, C, below the turn-table, and inclined so as to bring its lower end into proximity with the upper end of a central hoist by which ammunition can be raised up into the chamber or space C to be transferred to the hoists descending from the turn-table, substantially as described.

3. The combination of the turn table or turret A, two guns, B, mounted thereon, a hoist, D, in rear of each gun descending into a chamber or space, C, below the turn-table, a central hoist, N, for raising ammunition into this space, the pivoting-head N' of the central hoist, and the pivoting shot-tray I of the hoist D, and bolt R for locking the one to the other, substantially as described.

4. The combination of the turn-table or turret having the space or chamber immediately beneath it, the central hoist by which ammunition is raised into the space or chamber, the gun mounted on the turn-table, the hoist carried by the turn-table in rear of the gun descending into the space or chamber to elevate the ammunition raised thereto, and provided with the shot-tray and with the powder-chamber beneath the shot-tray, the hydraulic cylinder in the chamber or space, and the telescopic ram thereof actuating the hoist in rear of the gun to successively bring the shot-tray and the powder-chamber into loading position, substantially as and for the purpose set forth.

C. H. MURRAY.

Witnesses:
WM. JOHN GREY,
*Notary Public.*
T. PURVIS.